Sept. 20, 1949. H. MOBBS ET AL 2,482,429
SLIDING ROOF FOR VEHICLES
Filed Nov. 21, 1947 3 Sheets-Sheet 1
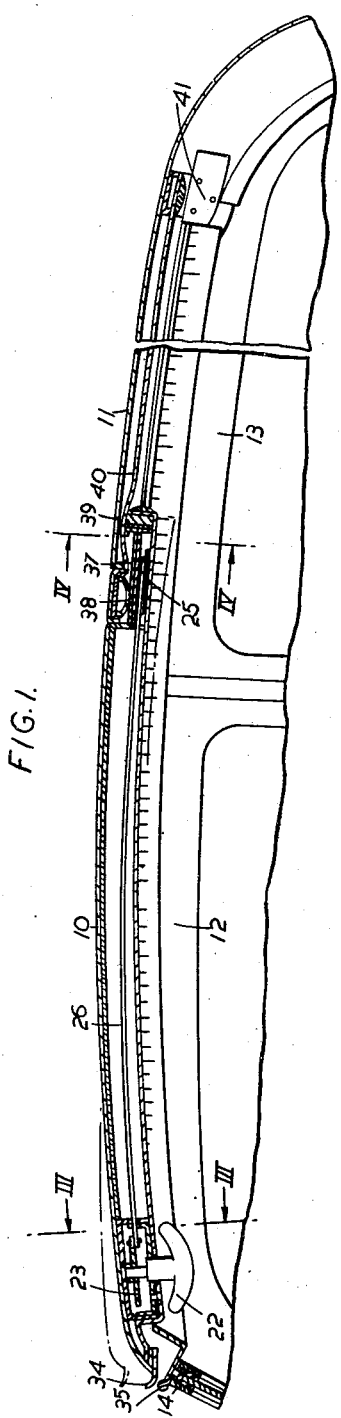
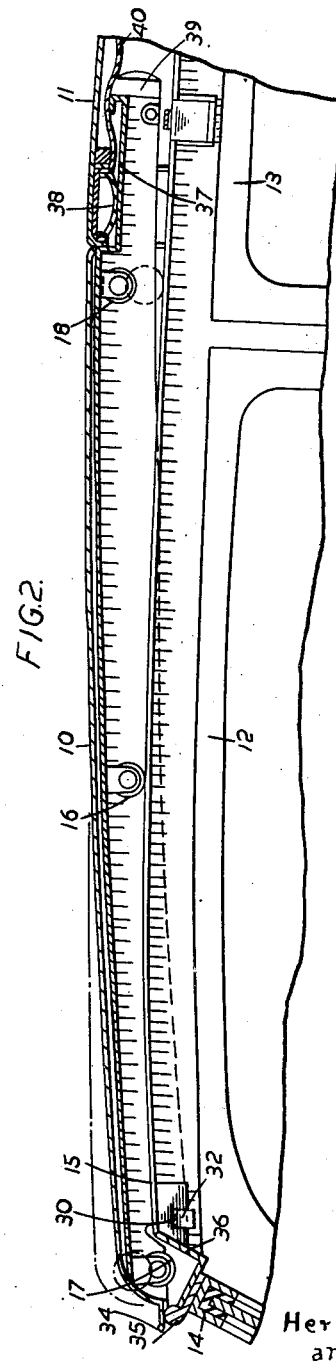
Inventor
Herbert Mobbs
and Geo. H. Smith
Attorney

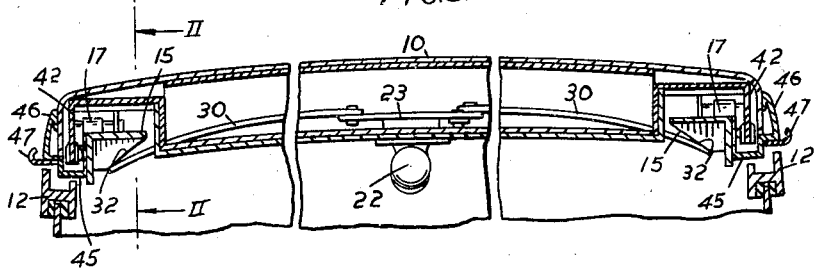
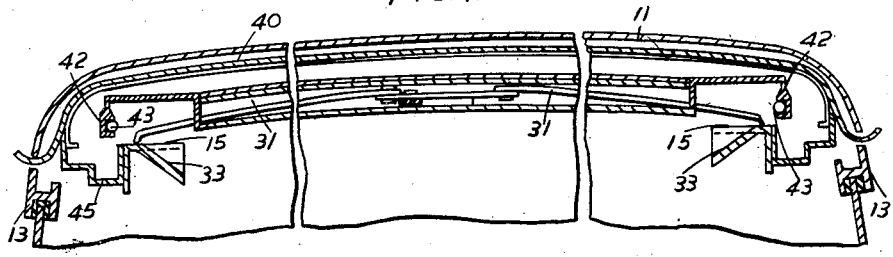
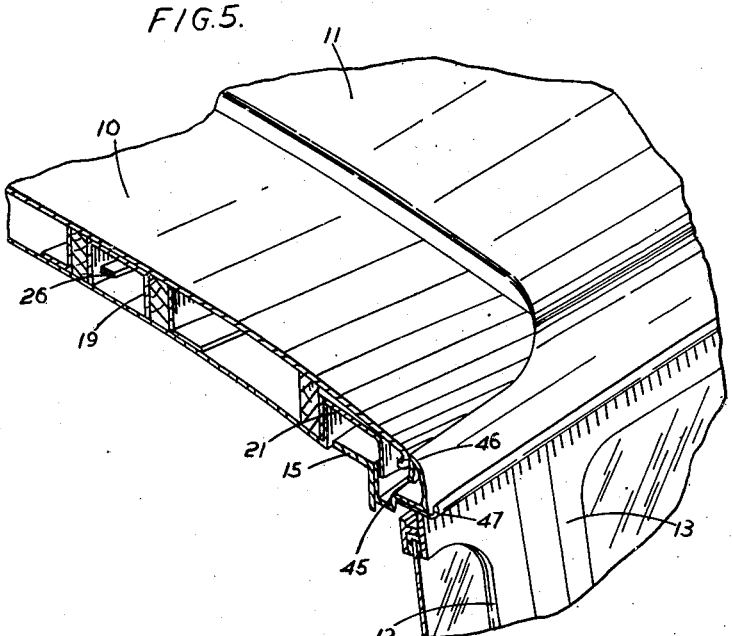

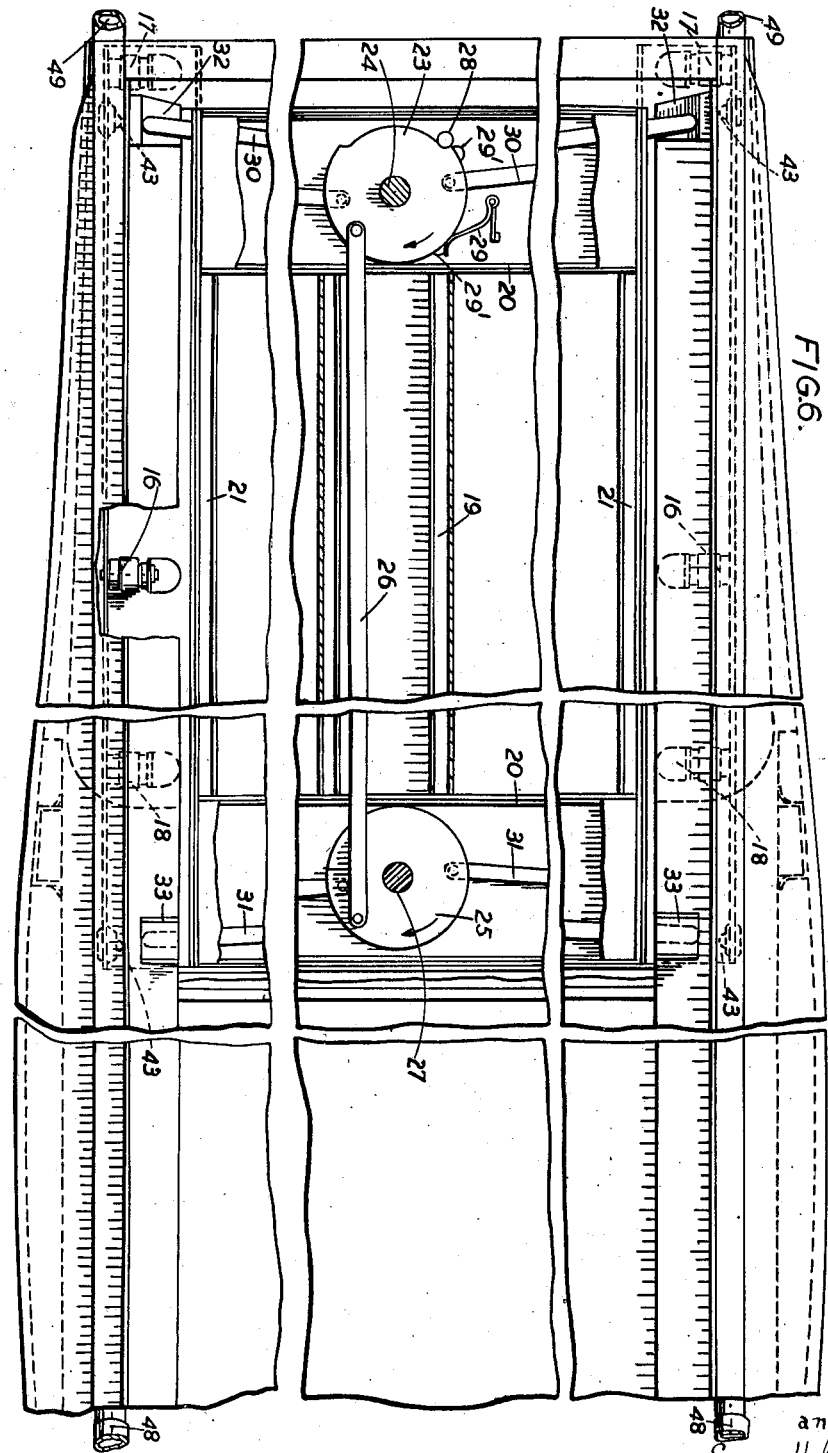

Patented Sept. 20, 1949

2,482,429

UNITED STATES PATENT OFFICE 2,482,429

SLIDING ROOF FOR VEHICLES

Herbert Mobbs, Church Brampton, near Northampton, and George Henry Smith, Slough, England Application November 21, 1947, Serial No. 787,366
In Great Britain November 28, 1946

6 Claims. (Cl. 296—137)

1

This invention relates to roofs for vehicles of the type in which a slidable panel normally closes an opening in the roof and can be locked in the closed position, or can be released and moved along guides to expose the opening more or less as may be required.

One object of this invention is to provide more effective means for guiding the slidable panel in its movements and supporting it in intermediate or partially opened positions.

Another object is to provide improved means for locking the panel which will be particularly effective in preventing any undesired movements of the panel when locked in either the closed or in partially opened positions.

A still further object is to provide locking means for the slidable panel effective to give locking engagement at all four corners of the panel, particularly when it is in its closed position.

With these and other objects in view the invention comprises the features of construction and operation more particularly described with reference to the accompanying drawings which illustrate an embodiment of the invention.

In the drawings:

Figure 1 is a central longitudinal section of a vehicle roof;

Figure 2 shows, to a larger scale, a longitudinal section on the line indicated at II—II in Figure 3;

Figure 3 is a transverse section, partly broken away, taken on the line III—III of Figure 1;

Figure 4 is a transverse section partly broken away, taken on the line IV—IV of Figure 1;

Figure 5 is a partial sectional perspective view of the vehicle roof at one side of a vehicle; and Figure 6 is an underneath plan view, partly broken away, and partly in section, of a vehicle roof embodying the features of the invention.

In the drawings, 10 represents the sliding panel and 11 the cover of the fixed roof extending toward the rear of the vehicle, while 12 is the front door, 13 is the rear door and 14 the windscreen. The rails near each side of the roof on which the panel can move are in the form of angle irons 15, the panel having downwardly projecting lugs carrying rollers 16 at about its mid-length, and similar lugs carrying rollers 17 and 18 near its front and rear ends for running on the rails 15. In the example shown the rollers 16 are on a transverse axis a little in front of the middle of the panel so that the panel tends to rise at the front and fall at the rear about this axis when free to do so. The panel 10 is supported by a frame which includes a central longitudinal channel member 19, front and rear channel members 20

2 accommodating the locking mechanism, and side channel members 21. A handle 22 under the front channel member 20 serves to turn a short shaft 24 carrying a disc 23 which is connected by a link 26 to a similar disc 25 mounted on a short shaft 27 under the rear of the panel. By this connection both discs 23 and 25 are turned and controlled simultaneously by the handle 22. The disc 23 has a notch in its periphery where a stop pin 28 is arranged for limiting the turning movements of the discs up to about 90 degrees. A spring 29 bearing on the edge of disc 23 between lugs $29^1$ projecting therefrom, also checks the turning movements of the discs 23 and 25. Links 30 attached at their inner ends to the disc 23, extend through slots in the frame of the panel and their outer ends are adapted to engage under the rails 15 for locking purposes. Similar links 31 extend from the rear disc 25 through slots in the frame of the panel, to engage with the rails 15 toward the rear.

In the closed position of the panel its front end must be held down while its rear end is raised, and this result is attained by providing wedge surfaces or ramps 32 at the front under the rails 15, and wedge surfaces or ramps 33 at the rear which are oppositely inclined, so that the ends of links 30 and 31 when extended, engaging with these ramps, will cause the front of the panel to descend while turning about the rollers 16 as a pivot. This turning movement is then possible because the rails 15 terminate near the front as seen in Figures 1 and 2 before the top of the windscreen which is connected to the rails by a channel member 36. The rollers 17 at the front can descend into this channel member, as seen in Figure 2. The panel carries a flange plate 34 at the front which bears against a resilient beading 35 to form a fluid-tight joint when the front of the panel is drawn down. The rear end of the panel rises in the closed position, while the rollers 18 are lifted clear of the rails 15 as seen in Figure 2, and a stepped portion 37 at the rear of the panel comes against a resilient packing 38 inside the fixed roof 11 to form a fluid-tight joint at the rear. The top of the panel forms a continuation of the curved surface 11 of the fixed roof when the panel is raised at the rear as seen in Figures 1 and 2. The chain-dotted lines in these figures show the extent of the rising movement of the front of the panel when the links 30 and 31 are withdrawn out of engagement with the ramps 32 and 33 respectively. The rear end of the panel is then at a low enough level to pass under the fixed roof 11. The fixed roof has an internal plate 40 and the rear of the panel has a buffer bar 39 across it, which comes to rest in an upward bulge in the plate 40 in the closed position of the panel as in Figure 1. When the rear end of the panel is lowered the bar 39 moves under the plate 40 until it is arrested by an abutment 41 at the rear. The plate 40 prevents the rear end from rising until the panel is drawn fully forward again ready for closing its front end over the windscreen.

The flanges of the rails 15 have affixed thereto as by welding metal gutters 45 which may form an extension of the outer cover 11 of the fixed roof as seen in Figure 5, and which provide upstanding outer walls 46 rising inside the cornice-mouldings 47 serving to obscure the edges of the panel as seen from the sides of the vehicle. The panel is guided laterally by downward extensions 42 at each side at the front and rear ends carrying sockets with balls 43 projecting from them. These balls run against the faces of the gutters 45 attached to the flanges of the rails 15 as seen in Figure 3. In the closed position of the panel the balls 43 at the rear are raised clear of the rails as seen in Figure 4, but they descend and bear against the faces of the gutters 45 on the rails 15 when the rear end of the panel is lowered ready for pushing it backwardly under the fixed roof.

Drainage tubes 48, Figure 6, extend rearwardly from the gutters 45 to carry away rainwater, and tubes 49 at the front extending down the side posts of the windscreen serve a similar purpose at this end of the gutters.

In all intermediate positions of the panel in which the front of the panel is drawn back from the windscreen, the extensions 42 and balls 43 provide full lateral guidance, while the rollers 16, 17 and 18 running on the rails 15 make forward and backward sliding movements of the panel easy. The rollers 17 and 18 may be rubber-covered but the middle rollers 16 which are always in contact with the rails 15 may have metal surfaces contacting with the rails. In all intermediate positions of the panel the links 30 engage under the rails 15 without pulling the front down as the rear of the panel cannot rise when under the fixed roof 11 and 40. The links 31 also project beneath the rails 15 when the rear end of the panel is lowered and moved back far enough for the links 30 and 31 to be clear of the ramps 32 and 33 respectively. The pressure of the ends of links 30 and 31 under the rails 15 provides all the locking action required.

The details of the construction may be varied, and for example rollers or other means of guidance can be used in place of the balls 43, while the internal construction and framework of the panel can be varied according to the type and size of vehicle to which the sliding panel is fitted.

We claim:

1. A vehicle roof comprising a fixed roof portion with an opening therein at its front end, a slidable panel adapted to close said opening, guide rails at each side of the fixed roof portion extending near to the front thereof and extending backwardly under the fixed roof portion, anti-friction means for supporting said slidable panel on said guide rails at a position intermediate of its length about which said panel is adapted to rock in its forward position, additional anti-friction means of support adjacent the front end of said panel adapted to run on said guide rails when said panel is retracted from or advanced towards said opening but to drop beyond the front ends of said guide rails when the panel is in its forward closing position, ramps associated with each of said guide rails near to the front ends thereof, and locking mechanism on said panel comprising members adapted to be projected against said ramps and thereby to draw down the front of said panel when said locking mechanism is operated.

2. A vehicle roof comprising a fixed roof portion with an opening therein at its front end, a slidable panel adapted to close said opening, guide rails at each side of the fixed roof portion extending near to the front thereof and extending backwardly under the fixed roof portion, anti-friction means for supporting said slidable panel on said guide rails at a position intermediate of its length about which said panel is adapted to rock in its forward position, additional anti-friction means of support adjacent the front end of said panel adapted to run on said guide rails when said panel is retracted from or advanced towards said opening but to drop beyond the front ends of said guide rails when the panel is in its forward closing position, ramps associated with each of said guide rails adjacent the front ends thereof and also adjacent the rear end of said opening in the fixed roof portion, an operating handle on said panel, and linkage operable by said handle including members adapted to be projected laterally and simultaneously adjacent to the front and rear corners of said panel whose ends are adapted for engaging with said ramps, the inclination of said ramps being such that said members when engaging said ramps may cause the panel to rock about its intermediate means of support in a direction such as to raise the rear end and lower the front end of said panel.

3. A vehicle roof as claimed in claim 2 in which the intermediate supporting means for said panel consists of rollers on a transverse axis near to the middle of the length of said panel, and the additional supporting means adjacent the front end of said panel also consists of rollers so placed as to drop beyond the front ends of said guide rails in the position of said panel in which it closes said opening in the fixed roof portion.

4. A vehicle roof comprising a fixed roof portion with an opening therein at its front end, a slidable panel adapted to close said opening, guide rails at each side of the fixed roof portion extending near to the front thereof and extending backwardly under the fixed roof portion, anti-friction means for supporting said slidable panel on said guide rails at a position intermediate of its length about which said panel is adapted to rock in its forward position, additional anti-friction means of support adjacent the front end of said panel adapted to run on said guide rails when said panel is retracted from or advanced towards said opening but to drop beyond the front ends of said guide rails when the panel is in its forward closing position, locking mechanism on said panel adapted to draw down the front of said panel in its forward closing position, and lateral guide members comprising rolling surfaces secured to said panel near to the front and rear ends thereof adapted to engage with lateral guide surfaces associated with said guide rails when the panel is in positions other than that in which it closes the opening in said fixed roof position.

5. A vehicle roof comprising a fixed roof portion with an opening therein at its front end, a slidable panel adapted to close said opening, guide rails at each side of the fixed roof portion extending near to the front thereof and extending backwardly under the fixed roof portion, anti-friction means for supporting said slidable panel on said guide rails at a position intermediate of its length about which said panel is adapted to rock in its forward position, additional anti-friction means of support adjacent the front end of said panel adapted to run on said guide rails when said panel is retracted from or advanced towards said opening but to drop beyond the front ends of said guide rails when the panel is in its forward closing position, locking mechanism on said panel adapted to draw down the front of said panel in its forward closing position, lateral extensions on the panel near the front and rear corners thereof, ball sockets on said extensions, balls in said sockets projecting therefrom on the side nearest said panel, and guide surfaces on the lateral faces of said guide rails against which said balls can bear when the panel is released and retracted from its position closing the opening in said fixed roof portion.

6. A vehicle roof comprising a fixed roof portion with an opening therein at its front end, a slidable panel adapted to close said opening, guide rails at each side of the fixed roof portion extending near to the front thereof and extending backwardly under the fixed roof portion, anti-friction means for supporting said slidable panel on said guide rails at a position intermediate of its length about which said panel is adapted to rock in its forward position, additional anti-friction means of support adjacent the front end of said panel adapted to run on said guide rails when said panel is retracted from or advanced towards said opening but to drop beyond the front ends of said guide rails when the panel is in its forward closing position, further anti-friction means of support adjacent the rear end of said panel adapted to run on said guide rails when said panel is raised at the front and lowered at the rear end thereof, and locking mechanism on said panel adapted to draw down the front of said panel when said locking mechanism is operated.

HERBERT MOBBS.
GEORGE HENRY SMITH.

REFERENCES CITED

The following references are of record in the file of this patent:

UNITED STATES PATENTS

| Number | Name | Date |
| --- | --- | --- |
| 2,108,456 | Thompson et al. | Feb. 15, 1938 |
| 2,201,330 | Wering et al. | May 21, 1940 |
| 2,245,832 | Simpson | June 17, 1941 |
| 2,263,216 | Latchford | Nov. 18, 1941 |
| 2,434,711 | Mobbs et al. | Jan. 20, 1948 |